United States Patent
Knab et al.

(10) Patent No.: US 6,712,434 B2
(45) Date of Patent: Mar. 30, 2004

(54) CABINET, PARTICULARLY EQUIPMENT CABINET

(75) Inventors: Josef Knab, Rossbach (DE); Werner Spateneder, Pfarrkirchen (DE); Stefan Gramelsberger, Eichendorf (DE); Siegfried Schneiderbauer, Rossbach (DE); Alexander Prinz, Postmuenster (DE)

(73) Assignee: Knuerr AG, Arnstorf (DE)

( * ) Notice: Subject to any disclaimer, the term of this patent is extended or adjusted under 35 U.S.C. 154(b) by 155 days.

(21) Appl. No.: 09/984,210

(22) Filed: Oct. 29, 2001

(65) Prior Publication Data

US 2002/0050772 A1 May 2, 2002

(30) Foreign Application Priority Data

Oct. 27, 2000 (DE) .......................................... 100 53 433

(51) Int. Cl.[7] .............................................. A47G 29/00
(52) U.S. Cl. ...................... 312/265.4; 312/287; 16/225; 403/231; 403/382
(58) Field of Search ................................ 312/324, 326, 312/329, 283, 285, 287, 286, 289, 265.4, 223.1, 265.1; 403/382, 231, 230; 16/366, 367, 368, 382, 225; 49/382, 192, 397

(56) References Cited

U.S. PATENT DOCUMENTS

| | | | | |
|---|---|---|---|---|
| 3,166,367 A | * | 1/1965 | Vincens | 312/329 |
| 4,047,342 A | * | 9/1977 | Boulva | 16/225 |
| 4,544,069 A | * | 10/1985 | Cavallini | 403/172 |
| 4,620,392 A | * | 11/1986 | Kerpers et al. | 49/382 |
| 5,042,198 A | * | 8/1991 | Privratsky | 16/366 |
| 5,423,604 A | * | 6/1995 | Chern | 312/265.4 |
| 5,682,643 A | * | 11/1997 | Duffy | 16/225 |
| 5,806,946 A | * | 9/1998 | Benner et al. | 312/265.4 |
| 5,810,501 A | * | 9/1998 | Ross | 403/231 |
| 5,899,545 A | * | 5/1999 | Besserer et al. | 312/265.4 |
| 5,932,843 A | * | 8/1999 | Besserer et al. | 312/265.5 |

FOREIGN PATENT DOCUMENTS

| | | |
|---|---|---|
| DE | 44 39 544 A1 | 5/1996 |
| DE | 297 11 262 U1 | 10/1997 |
| EP | 0 789 985 B1 | 8/1997 |
| GB | 2024903 | * 1/1980 |

* cited by examiner

Primary Examiner—Lanna Mai
Assistant Examiner—Hanh V. Tran
(74) Attorney, Agent, or Firm—Jacobson Holman PLLC

(57) ABSTRACT

In a cabinet, particularly an equipment cabinet for electrical and electronic components and equipment having a particularly simple construction and ensuring an optimum accessibility to the installation area as well as a high security against unauthorized opening, not only the front door and a rear wall, but also the side walls are provided with hinges and can be articulated, as desired, either on the right or left. The hinge system has upper and lower hinge pins and two hinge pin receptacles in each corner connector of a frame. The two hinge pin receptacles are in each case formed in a shoulder of the corner connector.

11 Claims, 2 Drawing Sheets

CABINET, PARTICULARLY EQUIPMENT CABINET

BACKGROUND OF THE INVENTION

1. Field of the Invention

The invention relates to a cabinet, particularly an equipment cabinet for electrical and electronic components and equipment, having a frame formed from transverse profiles, depth profiles and vertical profiles, which are interconnected by means of corner connectors, and having a front door, a rear wall, two side walls, a top part and a bottom part for covering or facing the frame, the front door being articulated by means of a hinge system, which has a lower and an upper hinge pin on the front door and a hinge pin receptacle in the upper and lower corner connectors.

2. Description of the Related Art

DE 297 11 262.7 U1 discloses an equipment cabinet with side parts, which, like a front and rear door are constructed as covering doors and which are in each case articulated to a vertical support profile. The support profiles form the corner areas of the covering and are constructed for receiving a self-supporting frame, which bounds a reception area for components, equipment, etc. Hinging takes place by means of the support profiles, which have a central opening, which is constructed in terminal areas for receiving a hinge pin. A hinge pin receptacle is formed in an upper and a bottom side cover.

A further equipment cabinet is known from EP 789 985 B1. Transverse, depth and vertical profiles of the frame are produced from a hollow profile or section, which is bent many times and has two identical receptacles, which are connected by a roughly diagonal connecting area. In each of the two receptacles engage plug-in lugs of the corner connectors, which have a roughly square construction. As a result of the diagonal connecting areas of the vertical profiles the corner connectors project and for right and left-side articulation and corresponding locking of the front door are provided with a hinge pin receptacle or locking bolt receptacle. The hinge pins or the locking bolt or bolts are guided in the front door. The side walls and the rear wall, together with a top and a bottom plate are firmly screwed to the corner connectors. As the corner connector parts form the outer edges of the frame, set back contact surfaces are needed for the firmly screwed covering parts.

In addition, the front door and firmly screwed side walls and rear wall are provided with bevelled corner areas, in order to bring about a tight engagement with the corner connectors. Besides these constructional disadvantages, there is a further disadvantage in that access to the installation area of the switch cabinet and to the equipment and components housed therein is only possible by means of the front door.

SUMMARY OF THE INVENTION

The object of the invention is to create a cabinet, particularly an equipment cabinet, which ensures a particularly simple construction, an optimum accessibility to the installation area and also high security against unauthorized opening.

According to the invention an all-round accessibility can be achieved through the construction of the side walls and the rear wall as covering doors. In an extremely simple construction it is possible to have either a right-hand or left-hand articulation of the front door, the rear wall and the side walls in that the hinge system is integrated into the corner connectors, has two pivot pins and a lower and an associated upper corner connector are constructed for receiving in each case two hinge pins. The hinge axes are parallel to one another.

Appropriately each corner connector has a shoulder on an outside and in said shoulder are formed two hinge pin receptacles, e.g. as holes constructed in complimentary manner to the hinge pins and equidistantly spaced from an angle bisector of the corner area.

The sought security concept is brought about in that the upper and lower hinge pins can only be operated from the inside of the equipment cabinet, i.e. after opening the front door or the rear wall or rear door and in this way the side walls can be opened.

It is particularly advantageous that the hinge side of the front door and the rear wall or rear door can be selected in accordance with requirements and can also be modified in a particularly simple manner should this prove necessary.

It is advantageous that the hinge pin receptacles in the shoulder of the corner connectors can be used for receiving a locking bolt or a locking bar.

Appropriately both longitudinal sides of the side walls are in each case provided with an upper and a lower hinge pin. These hinge pins can only be operated, i.e. vertically adjusted from the inside and permit articulation on either side. Therefore the hinge pins can serve on one longitudinal side for the construction of a pivot axis and on the opposite side as a locking pin. If the hinge pins and locking pins are provided with a handle, e.g. with an end region bent by approximately 90°, a particularly simple and easily manipulatable actuation can take place.

In an extremely simple construction a hinge pin fastening is provided on the inside of the side walls as well as of the front door and rear wall. Appropriately there is at least one hinge pin guide and for the secure retaining of a hinge pin in the hinge pin receptacle of a shoulder of a corner connector it is appropriate a spring to act on the pin. The unlocking and extraction of the hinge pin from the hinge pin receptacle of the corner connector shoulder then takes place counter to spring pressure.

In an appropriate construction the shoulder of the corner connector has a roughly tongue-like construction and extends from an upper or lower contact area for a top or bottom part with a bevel to approximately half the height of the corner connector. The outwardly directed shoulder is rounded. In the direction of the covering parts or their hinge pins a pivoting area is provided. It is particularly advantageous that in the case of an articulation of two covering parts on an upper and a lower corner connector, one covering part can have an opening angle of up to approximately 180°. The second covering part can still be opened up to approximately 90°.

Facing the shoulder and directed into the interior there is an attachment tab on the corner connector. This attachment tab advantageously serves to receive and fix the top part or bottom part. Like the outside shoulder, the attachment tab is located on the angle bisector of a corner area and is advantageously provided with at least one fixing opening for receiving a fixing screw.

The frame can have profiles with a square or rectangular cross-section and longitudinal grooves for fixing rails, profiles and other components. In a particularly advantageous construction the frame of the cabinet according to the invention comprises triangular profiles and the depth and transverse profiles together with the corner connectors form an upper and a lower frame members, which are interconnected by vertical profiles. Reference is made to German patent applications 100 21 719.2 and 100 21 718.4, in which a description is given of frames formed from triangular profiles with corner connectors. The plug-in lugs of the corner connectors can, in a special development, be in each case in two parts and can be received in outwardly directed, acute-angled areas of the transverse and depth profiles. The profiles can be directly fixed on one or two plug-in lugs of the corner connectors or can be fixed indirectly with the aid of a clamp means. In this connection reference is made to the two aforementioned German patent applications.

BRIEF DESCRIPTION OF THE DRAWINGS

The invention is described in greater detail hereinafter relative to the attached drawings, wherein show.

DESCRIPTION OF THE PREFERRED EMBODIMENTS

Figure 1:
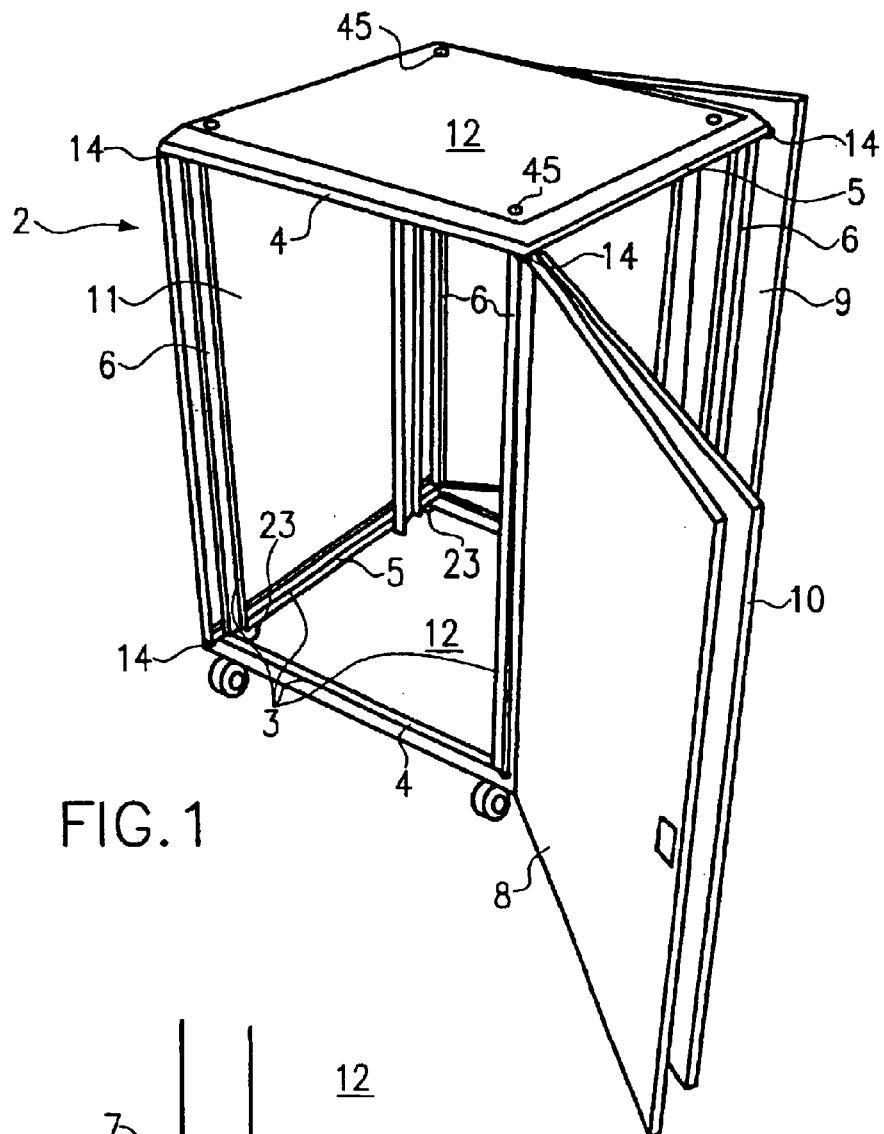
FIG. 1 An equipment cabinet according to the invention.

FIG. 1 shows a cabinet 2, which is to serve as a small equipment cabinet for the reception of electrical and electronic components, equipment and modules (not shown).

The equipment cabinet 2 has a frame 3 with transverse profiles 4, depth profiles 5 and vertical profiles 6, which are interconnected by means of corner connectors 7 (cf. FIGS. 2 to 5). For facing or covering the cabinet 2 are provided a front door 8, a rear wall 9, two side walls 10, 11, as well as a top part 12 and a bottom part 13.

FIG. 1 shows the front door 8, rear wall 9 and right-hand side wall 10 in the open position, whereas the left-hand side wall 11 is shown in the covering position. It is clear that the covering parts 8 to 12 in the covering position extend over the frame 3 and virtually engage on one another with complimentary shaped corner areas.

The hinge system of the pivotably articulated covering parts, i.e. the side walls 10, 11, rear wall 9 and front door 8 is integrated into the corner connectors 7. To this end the corner connectors 7 are provided with a shoulder 14, which is so positioned and constructed that each covering part 8 to 11 can be articulated, as desired, to the circumference of the cabinet 2 and can be brought into an open position of up to 180°. This ensures a very good accessibility to the installation area of the cabinet 2 and the equipment, components, etc. (not shown) located there. In the cabinet 2 according to FIG. 1 the front door 8 and right-hand side wall 10 are rendered pivotable by not shown hinge systems integrated into an upper and a lower corner connector 7 and it is clear that in the open position of the side wall 10 with an opening angle of approximately 180°, the front door 8 still has an opening angle of approximately 90° and vice versa.

The construction of two pivot pins or axes for two juxtaposed covering parts comprises two hinge pin receptacles 17, 18 in the shoulder 14 of an upper and lower corner connector 7 (cf. FIGS. 3 and 4), as well as hinge pins, which are located on inside corner areas of the side walls 10, 11, of front door 8 and rear wall 9.

Figure 2:
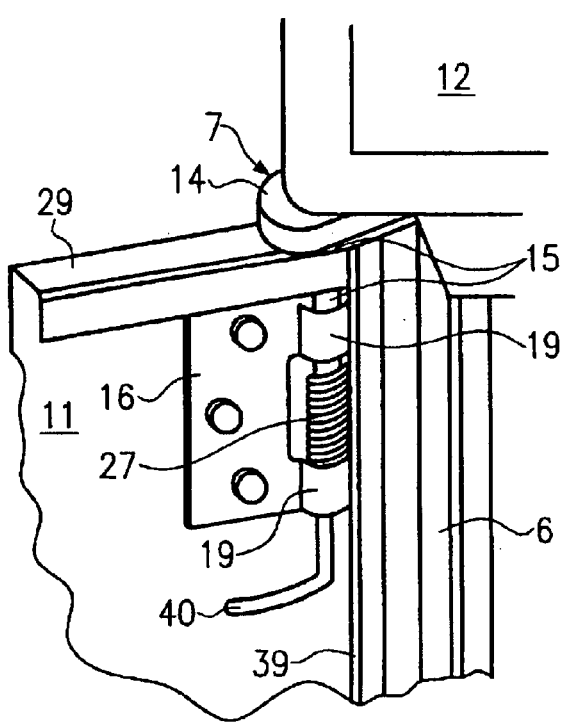
FIG. 2 A hinge system of a side wall of the cabinet according to FIG. 1.

FIG. 2 shows the upper, rear hinge system of side wall 11. Besides the side wall 11 with a L-shaped, bent, horizontal edge area 29 and a vertical edge area 39 bent at right angles, it is possible to see a vertical profile 6 and the shoulder 14 of the upper corner connector 7, which is almost completely covered by the top part 12. On the inside of the side wall 11 and immediately adjacent to the edge areas 29, 39 is fixed a fixing plate 16 for a hinge pin 15. The hinge pin 15 is guided in a lower and upper hinge pin guide 19 of the fixing plate 16 and is held in the operating position by a compression spring 27. The hinge pin 15 is provided with a handle 40 and can be adjusted counter to the spring pressure, in this case downwards, so that an engagement in one of the two hinge pin receptacles 17, 18 of the corner connector shoulder 14 no longer exists. If the lower and upper hinge pins 15 of the side wall 11 are simultaneously retracted, the side wall 11 can be opened about a front pivot axis, which is constructed identically to the hinge system shown in FIG. 2. It is particularly advantageous that an operation of the hinge pins 15 and consequently an opening of the side walls 10, 11 can only take place when the front door 8 or rear wall 9 are open. This effectively prevents unauthorized opening from the outside.

Figure 3:
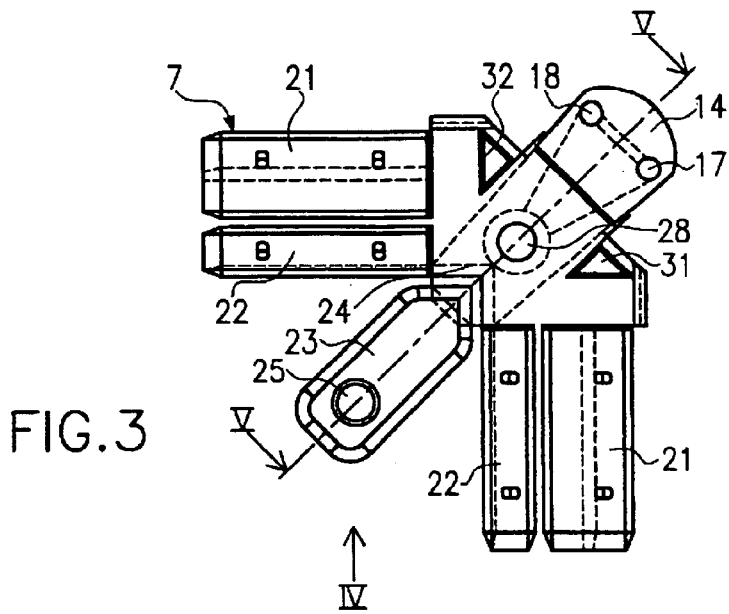
FIG. 3 A plan view of a corner connector of the equipment cabinet.
Figure 4:
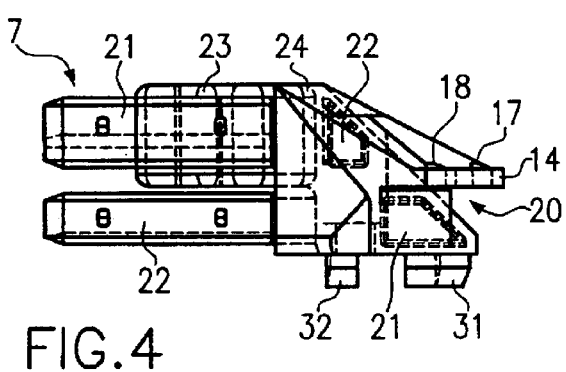
FIG. 4 A view in accordance with arrow IV in FIG. 3.
Figure 5:
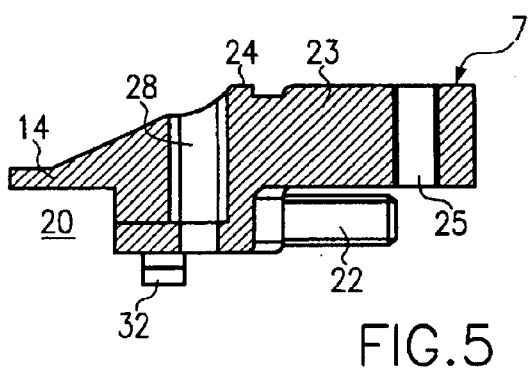
FIG. 5 A sectional view of the corner connector along line V—V in FIG. 3.
Figure 6:
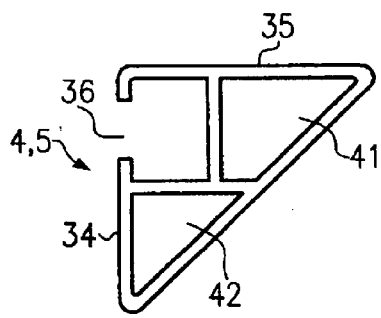
FIG. 6 A cross-section through a depth or transverse profile of the frame.

The construction of a corner connector, as shown in FIGS. 3 to 5, corresponds to the transverse and depth profiles 4, 5 (cf. FIG. 6) and the vertical profiles 6 (cf. FIG. 7) used for the frame 3. According to FIG. 3 the corner connector 7 is in plan view roughly rectangular and is constructed with in each case two plug-in lugs 21, 22 for the reception of a transverse profile 4 and a depth profile 5. The plug-in lugs 21, 22 are different from one another and are constructed for insertion in reception areas 41, 42 of the transverse profiles 4 or depth profiles 5 (FIG. 6). FIG. 4 shows the reception of the plug-in lugs 21, 22 of a transverse profile 4 on the top-side frame.

The shoulder 14 of the upper corner connector 7 of FIGS. 3 to 5 is arranged diagonally or in the extension of an angle bisector of the corner area and is directed outwards and equidistantly from the angle bisector has the two hinge pin receptacles 17, 18, which ensure the articulation of two covering parts 8 to 11 in an corner area of the cabinet 2. The shoulder 14 has a tongue or roof-like construction and slopes outwards from an upper bearing area 24, the shoulder 14 extending roughly over half the height of the corner connector 7 (cf. FIGS. 4 and 5). Below the shoulder 14 is formed a pivoting area 20 for two covering parts. The corner connector 7 is centrally provided with a hole 28, which is used for receiving a not shown fixing element for the connection of a vertical profile 6. In the vertical profile 6 (FIG. 7) is formed a complimentary fixing hole 48, which is aligned with the hole 28 of the corner connector 7 in the fixing position of the vertical profile 6. For locking the vertical profile 6 on the corner connector 7 are also formed plug-in elements 31, 32, which engage in reception areas 43, 44 of the vertical profile 6.

On the corner connector 7 is also formed an attachment tab 23, which is directed inwards and counter to the shoulder 14, being provided with a block-like construction. Together with a bearing area 24, said attachment tab 23 forms a plane and supports and fixes the top part 12 or bottom part 13 (cf. also FIG. 1). For this purpose a fixing opening 25 is provided in which are guided and secured fixing elements 45 (cf. FIG. 1).

Figure 7:
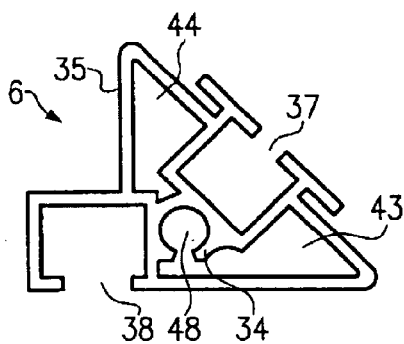
FIG. 7 A cross-section through a vertical profile of the frame.

It is possible to use for the frame 3 of the cabinet 2 in FIG. 1 triangular profiles, as shown in FIGS. 6 and 7. They are constructed in cross-section as a right-angled triangle, the lateral faces 34, 35 forming the right angle being in each case directed into the interior of the equipment cabinet. The vertically positioned lateral face 34 of the transverse and depth profiles 4, 5 is provided with a fixing groove 36.

The vertical profile 6 (FIG. 7) essentially corresponds to the profile according to FIG. 6. A fixing hole 48 is longitudinally positioned for the purpose of fixing to an upper and lower corner connector 7. On the outside is formed a groove 37, which can in particular be used for receiving mounted components and also for receiving seals, e.g. sealing strips, for constructing an IP-tight and/or EMC-shielded cabinet. An inside groove 38 is formed by additional chamfers in the region of the right angle and in the same way as the groove 37 can be used for receiving mounted components or a sealing strip or in the vicinity of the front door or rear wall or rear door for receiving a locking lever or a corresponding, not shown device.

What is claimed is:

1. A cabinet, having an interior space for housing electrical and electronic components and equipment or other items, comprising:

a frame formed from transverse profiles, depth profiles, and vertical profiles being interconnected by corner connectors;

covering parts including a front door, a rear wall, two side walls, a top part, and a bottom part for covering the frame;

a hinge system articulating the front door, the hinge system having a lower and an upper hinge pin on the front door and a hinge pin receptacle in the upper and lower corner connectors;

wherein each corner connector is provided with two hinge pin receptacles with parallel axes; and the side walls, the rear wall, and the front door are provided with hinge pins and are pivotable from a covering position into an open position to enable access to the equipment and components and enable either a right-hand or left-hand articulation of the front door, the rear wall, and the side walls.

2. The cabinet according to claim 1, wherein each corner connector has a shoulder, and the two hinge pin receptacles are formed in the shoulder.

3. The cabinet according to claim 2, wherein the hinge pins of the front door, rear wall, and side walls are located on the inside of the cabinet so that the side walls can only be opened when the rear wall or the front door is open.

4. The cabinet according to claim 3, wherein the hinge pins are each guided in a hinge pin guide and held under spring action in the particular hinge pin receptacle.

5. The cabinet according to claim 4, wherein the side walls each have front and rear longitudinal sides, each of which has an upper hinge pin and a lower hinge pin for enabling the hinge pins in one or the other of the sides to act as pivot axes for the side while the hinge pins for the other side act as locking pins in the hinge pin receptacles and can only by unlocked in the case of an open front door or open rear wall.

6. The cabinet according to claim 2, wherein the shoulder of each of the corner connectors has a tongue-like construction providing a pivoting area for enabling an opening angle of up to approximately 180° of one of two covering parts pivotally attached to the corner connector.

7. The cabinet according to claim 6, wherein the corner connectors include a first plug-in lug for reception of a depth profile and a second plug-in lug for reception of a transverse profile.

8. The cabinet according to claim 7, wherein the transverse profiles, depth profiles and vertical profiles are triangular profiles and the respective plug-in lugs are constructed for receiving and fixing the triangular profiles.

9. The cabinet according to claim 8, wherein for mounting a triangular transverse profile and depth profile in each case two plug-in lugs are provided, the plug-in lugs having different constructions and being insertable into outwardly directed, acute-angled areas of the triangular transverse profiles and depth profiles.

10. The cabinet according to claim 9, wherein the corner connectors in each case include an attachment tab for the attachment of the top or bottom parts.

11. The cabinet according to claim 10, wherein the attachment tabs are positioned internally and oriented horizontally on the corner connectors.

* * * * *